US006856051B2

(12) United States Patent
Reiter, Jr. et al.

(10) Patent No.: US 6,856,051 B2
(45) Date of Patent: Feb. 15, 2005

(54) MANUFACTURING METHOD AND COMPOSITE POWDER METAL ROTOR ASSEMBLY FOR CIRCUMFERENTIAL TYPE INTERIOR PERMANENT MAGNET MACHINE

(75) Inventors: Frederick B. Reiter, Jr., Cicero, IN (US); James L. Lobsinger, Fishers, IN (US); Tom L. Stuart, Pendleton, IN (US); Frank A. Wilder, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/970,105

(22) Filed: Oct. 3, 2001

(65) Prior Publication Data

US 2003/0062790 A1 Apr. 3, 2003

(51) Int. Cl.[7] .............................................. H02K 15/03
(52) U.S. Cl. ............................. 310/44; 29/598; 419/5; 310/156.56
(58) Field of Search .......................... 310/44, 156, 261; 29/598, 607; 106/38, 27; 419/5, 6; 428/570; 425/78; 264/299, 319, 320, 323, 325–326

(56) References Cited

U.S. PATENT DOCUMENTS

| | | | | |
|---|---|---|---|---|
| 3,864,154 A | * | 2/1975 | Gazza et al. ............. | 428/539.5 |
| 4,419,413 A | * | 12/1983 | Ebihara .................... | 419/6 |
| 4,713,215 A | * | 12/1987 | Madsac .................... | 419/8 |
| 5,010,266 A | * | 4/1991 | Uchida .................... | 310/156.22 |
| 5,091,022 A | * | 2/1992 | Achikita et al. ............ | 148/104 |
| 5,191,256 A | * | 3/1993 | Reiter et al. ........... | 310/156.49 |
| 5,371,426 A | * | 12/1994 | Nagate et al. ......... | 310/156.49 |
| 5,684,352 A | * | 11/1997 | Mita et al. .............. | 310/156.56 |
| 5,701,943 A | * | 12/1997 | Young .......................... | 164/97 |
| 5,722,032 A | * | 2/1998 | Gay .............................. | 419/6 |
| 6,208,054 B1 | * | 3/2001 | Tajima et al. ............... | 310/216 |
| 6,331,214 B1 | * | 12/2001 | Koga et al. ................. | 148/101 |
| 6,392,324 B1 | * | 5/2002 | Kuwahara ............... | 310/156.11 |

FOREIGN PATENT DOCUMENTS

JP         8-340666    * 12/1996   ......... H02K/19/14

* cited by examiner

*Primary Examiner*—Burton Mullins
(74) *Attorney, Agent, or Firm*—Jimmy L. Funke

(57) ABSTRACT

A composite powder metal disk for a rotor assembly in a circumferential type interior permanent magnet machine. The disk includes an inner ring of magnetically conducting powder metal compacted and sintered to a high density. The disk further includes an outer ring of permanent magnets separated by magnetically non-conducting powder metal compacted and sintered to a high density. The permanent magnets additionally are radially embedded by magnetically conducting powder metal compacted and sintered to a high density with optional intermediate non-conducting powder metal bridges extending radially from the permanent magnets to the outer surface of the disk. A rotor assembly is also provided having a plurality of the composite powder metal disks mounted axially along a shaft with their magnetic configurations aligned. A method for making the composite powder metal disks is further provided including filling a die with the powder metals, compacting the powders, and sintering the compacted powders.

60 Claims, 8 Drawing Sheets

MANUFACTURING METHOD AND COMPOSITE POWDER METAL ROTOR ASSEMBLY FOR CIRCUMFERENTIAL TYPE INTERIOR PERMANENT MAGNET MACHINE

FIELD OF THE INVENTION

This invention relates generally to interior permanent magnet machines, and more particularly, to the manufacture of rotors for a circumferential type interior permanent magnet machine.

BACKGROUND OF THE INVENTION

It is to be understood that the present invention relates to generators as well as to motors, however, to simplify the description that follows, a motor will be described with the understanding that the invention also relates to generators. With this understanding, there are two types of interior permanent magnet motors (IPM motors). In one type, the magnets lie orthogonally to the air gap between the rotor and stator, like spokes. In the other type, called circumferential IPM motors, the magnets face the air gap. Rotors for circumferential IPM motors have typically been made with stacked stamped steel laminations and circumferentially extending permanent magnets embedded in the interior of the laminations. These circumferential IPM motors utilize narrow bridges, slits and air spaces within the rotor to substantially reduce the flux leakage that occurs and that would occur to a debilitating degree if these features were not incorporated into the rotor lamination design. These features greatly weaken the rotor, not allowing it to rotate at medium high and high speeds, and still do not fully eliminate the flux leakage.

There is thus a need to develop a circumferential type IPM machine having a structurally robust rotor operable at medium high and high speeds with minimal rotor flux leakage, and preferably that may be produced at a lower cost than that of currently fabricated IPM machines.

SUMMARY OF THE INVENTION

The present invention provides a composite powder metal disk for a rotor assembly in a circumferential type IPM machine, the disks having an inner annular magnetically conducting segment and an outer annular permanent magnet segment. This outer annular segment includes alternating polarity permanent magnets separated in between by magnetically non-conducting barrier segments. The permanent magnets are also circumferentially embedded by radially outer magnetically conducting segments, which may optionally include intermediate magnetically non-conducting bridge segments extending from the permanent magnets to an outer surface of the disk. The inner annular and outer magnetically conducting segments comprise soft ferromagnetic powder metal compacted and sintered to a high density. The magnetically non-conducting barrier segments and optional bridge segments comprise non-ferromagnetic powder metal compacted and sintered to a high density. In a further embodiment, a rotor assembly is provided having a plurality of the composite powder metal disks axially stacked along and mounted to a shaft. There is further provided a method of making such a composite powder metal disk and rotor assembly in which a die is filled according to this desired magnetic pattern, followed by pressing the powder metals and sintering the compacted powder metals to achieve a high density composite powder metal disk of high structural stability. The permanent magnets may comprise hard ferromagnetic powder metal pressed and sintered concurrently or sequentially with the soft ferromagnetic and non-ferromagnetic powder metals, or may be prefabricated magnets adhesively affixed or otherwise bound within the composite powder metal disks after sintering the powder metal portions. These disks are then stacked axially along a shaft with their magnetic patterns aligned to form the powder metal rotor assembly. A circumferential type IPM machine incorporating the powder metal rotor assembly of the present invention exhibits increased power and speed capabilities, lower flux leakage, and may be produced at a lower cost.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
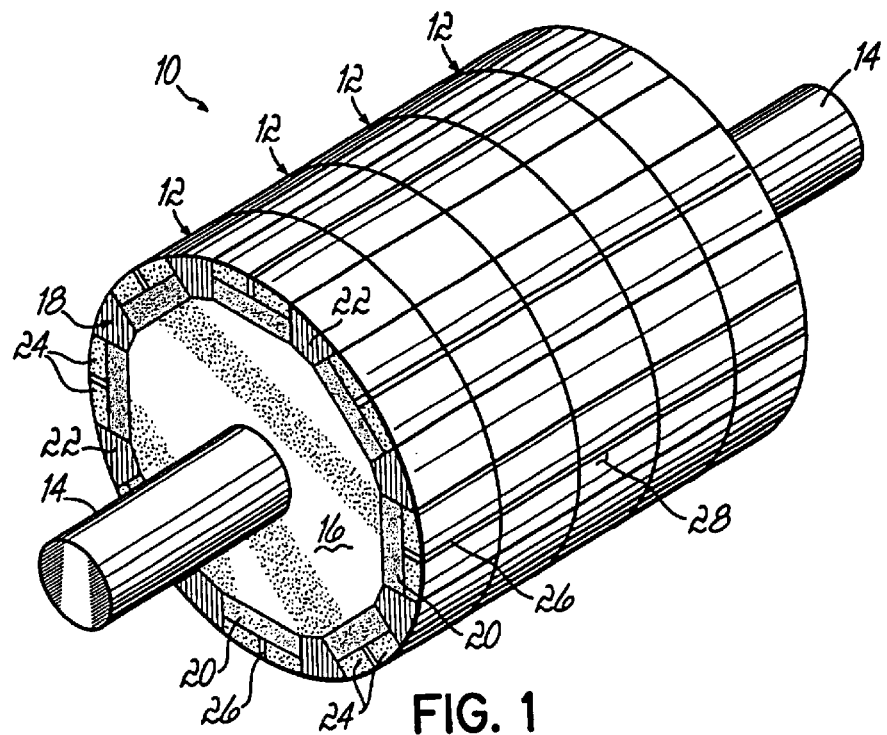
FIG. 1 is a perspective view of a powder metal rotor assembly of the present invention having a plurality of disks stacked along a shaft, each having interior permanent magnets embedded by powder metal segments.

The present invention provides composite powder metal rotor components for rotor assemblies in circumferential type interior permanent magnet machines. Permanent magnet machines incorporating the composite powder metal components exhibit high power density and efficiency and high speed rotating capability. To this end, and in accordance with the present invention, a plurality of powder metal disks or laminations are fabricated to comprise an inner annular magnetically conducting segment and an outer annular permanent magnet segment or ring.

The outer annular permanent magnet segment comprises a plurality of circumferentially positioned permanent magnets of alternating polarity separated by magnetically non-conducting segments. At the outer face of the permanent magnets, between the non-conducting barrier segments, are magnetically conducting segments referred to herein as radially outer magnetically conducting segments. These conducting segments together with the non-conducting barrier segments embed the permanent magnets within the disk. Each radially outer magnetically conducting segment may further include an intermediate non-conducting bridge segment that extends radially from the permanent magnet to the outer circumferential surface of the disk.

The inner annular and radially outer magnetically conducting segments comprise a pressed and sintered soft ferromagnetic powder metal. In an embodiment of the present invention, the soft ferromagnetic powder metal is nickel, iron, cobalt or an alloy thereof. In another embodiment of the present invention, this soft ferromagnetic metal is a low carbon steel or a high purity iron powder with a minor addition of phosphorus, such as covered by MPIF (Metal Powder Industry Federation) Standard 35 F-0000, which contains approximately 0.27% phosphorus. In general, AISI 400 series stainless steels are magnetically conducting, and may be used in the present invention.

The outer annular permanent magnet segment or ring comprises a series of alternating polarity permanent magnets, such as ferrite or rare earth permanent magnets. Depending on the particular machine, it is within the skill of one in the art to determine the appropriate number and size of permanent magnets to be circumferentially spaced around an interior portion of the disk. The permanent magnets may be either prefabricated magnets affixed to the inner annular segment and the magnetically non-conducting barrier segments, or pressed and sintered hard ferromagnetic powder metal.

The magnetically non-conducting barrier and bridge segments comprise pressed and sintered non-ferromagnetic powder metal. In an embodiment of the present invention, the non-ferromagnetic powder metal is austenitic stainless steel, such as SS316. In general, the AISI 300 series stainless steels are non-magnetic and may be used in the present invention. Also, the AISI 8000 series steels are non-magnetic and may be used.

In an embodiment of the present invention, the ferromagnetic metal of the inner annular and radially outer magnetically conducting segments and the non-ferromagnetic metal of the magnetically non-conducting barrier and bridge segments in the outer annular permanent magnet segment are chosen so as to have similar densities and sintering temperatures, and are approximately of the same strength, such that upon compaction and sintering, the materials behave in a similar fashion. In an embodiment of the present invention, the soft ferromagnetic powder metal is Fe-0.27%P and the non-ferromagnetic powder metal is SS316.

The inner annular magnetically conducting segment may optionally further comprise a magnetically non-conducting insert positioned to surround a shaft in the rotor assembly. This insert comprises non-ferromagnetic powder metal as described above in the outer annular permanent magnet segment. The insert functions to insulate the hub and shaft from magnetic flux. The insert may further have a star-shaped configuration designed to enhance the flux between the magnets, as will be shown and described further below.

The powder metal disks of the present invention typically exhibit magnetically conducting segments having at least about 95% of theoretical density, and typically between about 95%–98% of theoretical density. Wrought steel or iron has a theoretical density of about 7.85 gms/cm$^3$, and thus, the magnetically conducting segment exhibits a density of around 7.46–7.69 gms/cm$^3$. The optional non-conducting segments of the powder metal disks of the present invention exhibit a density of at least about 85% of theoretical density, which is on the order of about 6.7 gms/cm$^3$. Thus, the non-ferromagnetic powder metals are less compactible then the ferromagnetic powder metals. The pressed and sintered hard ferromagnetic powder metal magnets of certain embodiments of the present invention exhibit a density of at least 95.5%±about 3.5% of theoretical density, depending on fill factor, which is on the order of about 3.8–7.0 gms/cm$^3$.

The powder metal disks or rings can essentially be of any thickness. These disks are aligned axially along a shaft and mounted to the shaft to form a rotor assembly. The shaft is typically equipped with a key and the individual disks have a keyway on an interior surface to align the disks to the shaft upon attaching the part to the shaft. In an embodiment of the present invention, the individual disks or rings have a thickness on the order of about d-f inches. As disk thickness increases, the boundaries between the powder metal conducting segment and powder metal non-conducting segments or inserts may begin to blur. In practice, up to 13 disks of the present invention having a d-f inch thickness are suitable for forming a rotor assembly. There is, however, no limit to the thickness of each disk or the number of disks that may be utilized to construct a rotor assembly. The individual disks are aligned with respect to each other along the shaft such that the magnetic flux paths are aligned along the shaft. The non-ferromagnetic powder metal acts as an insulator between the aligned flux paths comprised of the soft ferromagnetic powder metal segment and the permanent magnets. This arrangement allows better direction of magnetic flux and improves the torque capability of the machine.

Figure 2:
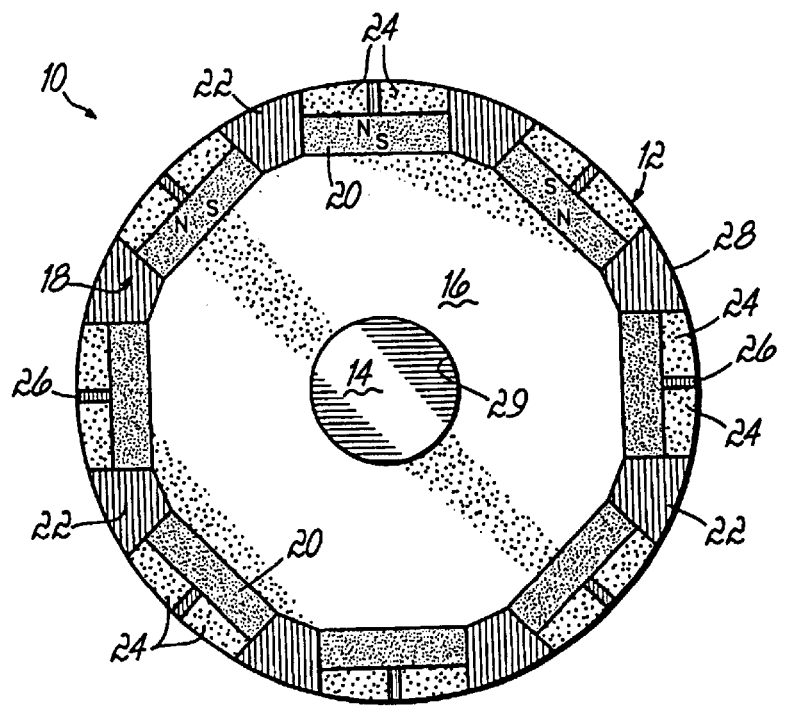
FIG. 2 is a plan view of the rotor assembly of FIG. 1.

With reference to the Figures in which like numerals are used throughout to represent like parts, FIGS. 1 and 2 depict in perspective view and plan view, respectively, a powder metal rotor assembly 10 of the present invention having a plurality of powder metal composite disks 12 stacked along a shaft 14, each disk 12 having an inner annular magnetically conducting segment 16 and an outer annular permanent magnet segment or ring 18 comprising a plurality of alternating polarity circumferentially extending permanent magnets 20. The disks are aligned from one disk 12 to another along the length of the shaft 14.

The outer annular permanent magnet segment 18 includes magnetically non-conducting barrier segments 22 separating the permanent magnets 20. The non-conducting barrier segments 22 provide insulation that directs the magnetic flux from one permanent magnet 20 to the next alternating polarity permanent magnet 20. This configuration enhances the magnetic flux in the air gap. The permanent magnet segment 18 further includes a radially outer magnetically conducting segment 24 adjacent each permanent magnet 20 that embeds the permanent magnet 20 in the disk 12. Each radially outer magnetically conducting segment 24 may include an intermediate magnetically non-conducting bridge segment 26 that extends radially from a respective permanent magnet 20 to an outer circumferential surface 28 of disk 12. Each bridge segment 26 essentially cuts its respective radially outer magnetically conducting segment 24 in two.

Alternatively, disk 12 can be made without the inner annular magnetically conducting segment 16. Thus, disk 12 would comprise a ring 18 of alternating polarity circumferentially extending permanent magnets 20 separated by magnetically non-conducting barrier segments 22 and partially embedded by radially outer magnetically conducting segments 24, with or without bridge segments 26. Disk 12 is then assembled onto a sleeve or cylinder, with or without a separate wrought or machined shaft.

Figure 3:
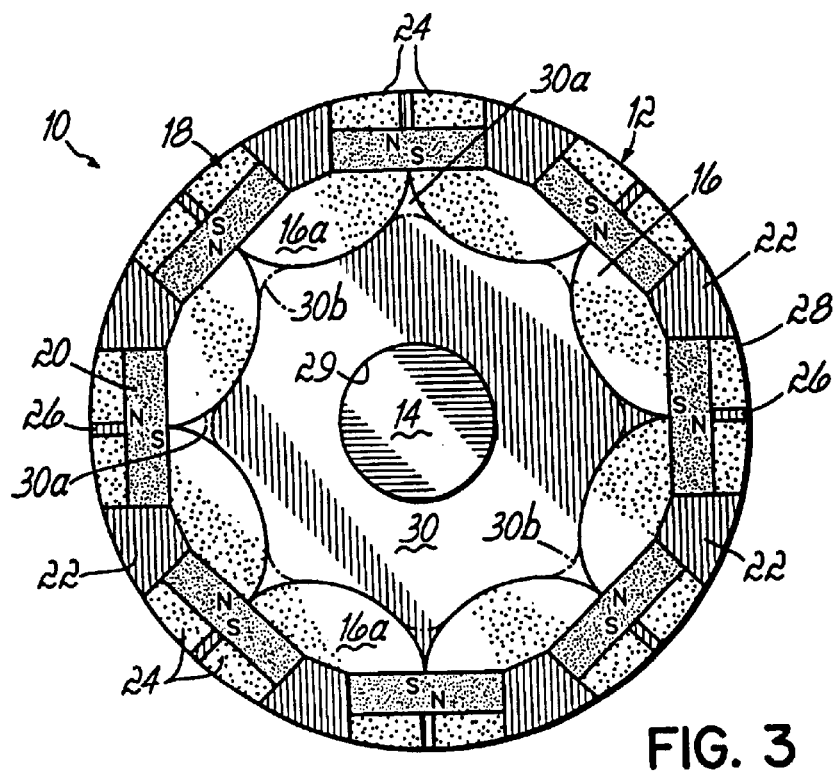
FIGS. 3–4 are plan views of alternative embodiments of powder metal rotor assemblies of the present invention having interior permanent magnets.

FIG. 3 depicts a disk similar in configuration to that depicted in FIGS. 1 and 2, but includes a magnetically non-conducting insert 30 in the inner annular segment 16.

Insert 30 may have an essentially star-shaped configuration and extends from the interior surface 29 of the disk 12 into tip portions 30a or 30b that terminate at (30a) or near (30b) a respective permanent magnet 20 in the outer annular permanent magnet segment 18. As can be seen, the magnetically conducting portion 16a of the inner annular magnetically conducting segment 16 directs magnetic flux from one permanent magnet 20 to the next alternating polarity permanent magnet 20. The insert 30 further blocks magnetic flux from being channeled into the shaft 14.

Figure 4:
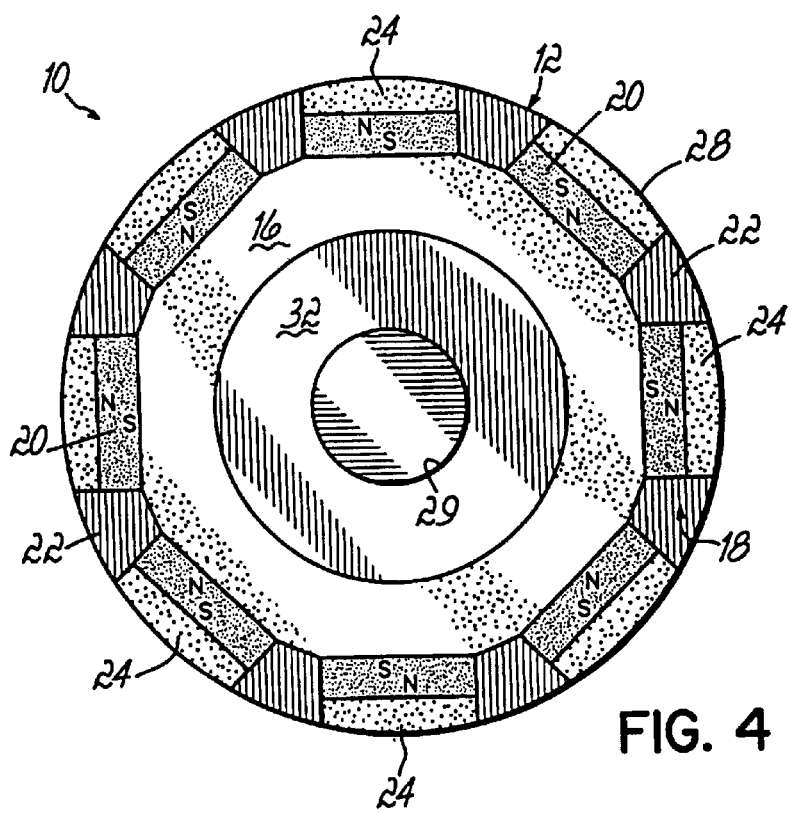

In FIG. 4, the composite powder metal disk 12 is similar to that depicted in FIGS. 1 and 2, but the disk 12 further includes an inner annular magnetically non-conducting insert 32 adjacent the interior surface 29 of the disk 12. As with the insert 30 of FIG. 3, insert 32 blocks magnetic flux from being channeled into the shaft 14. FIG. 4 also depicts an embodiment in which the radially outer magnetically conducting segments 24 do not include intermediate bridge segments.

While FIGS. 1–4 depict various embodiments for a circumferential type interior permanent magnet rotor, it should be appreciated that numerous other embodiments exist having a varying number of permanent magnets, and having various sizes of permanent magnets, as well as varying sizes for the non-conducting segments separating the permanent magnets, and the conducting segments embedding the magnets. Thus, the invention should not be limited to the particular embodiments shown in FIGS. 1–4. It should be further understood that each embodiment described as a disk could be formed as a ring, which is generally understood to have a smaller annular width and larger inner diameter than a disk. Thus, the term disk used throughout the description of the invention and in the claims hereafter is hereby defined to include a ring. Further, the term disk includes solid disks. The aperture in the center of the disk that receives the rotor shaft may be later formed, for example, by machining.

The present invention further provides a method for fabricating composite powder metal disks or rings for assembling into a rotor for a circumferential type interior permanent magnet machine. To this end, and in accordance with the present invention, a disk-shaped die is provided having discrete regions in a pattern corresponding to the desired rotor magnetic configuration. An inner annular region is filled with a soft ferromagnetic powder metal to ultimately form the inner annular magnetically conducting segment of the rotor, when included. In an outer annular portion of the die, a plurality of discrete regions are also filled with the soft ferromagnetic powder metal to ultimately form the radially outer magnetically conducting segments. Another plurality of discrete regions in the outer annular portion of the die are filled with non-ferromagnetic powder metal to ultimately form the magnetically non-conducting barrier and bridge segments of the rotor. In an embodiment in which the permanent magnets comprise hard ferromagnetic powder metal, yet another plurality of discrete regions in the outer annular portion of the die are filled with hard ferromagnetic powder metal. Alternatively, removable dummy inserts may be used to form spaces in which prefabricated permanent magnets may later be affixed.

The powder metals are pressed in the die to form a compacted powder metal disk. This compacted powder metal is then sintered to form a powder metal disk or lamination having an inner annular region of magnetically conducting material and an outer annular region of permanent magnets embedded by non-conducting and conducting materials, the disk exhibiting high structural stability. The pressing and sintering processes result in magnetically conducting segments having a density of at least about 95% of theoretical density, non-conducting segments having a density of at least about 85% of theoretical density and permanent magnets having a density of at least 95.5%±about 3.5% of theoretical density (depending on fill factor). The method for forming these rotors provides increased mechanical integrity, reduced flux leakage, more efficient flux channeling, reduced cost and simpler construction.

For alternative embodiments of a disk of the present invention, such as shown in FIGS. 3 and 4, a non-ferromagnetic powder metal is filled into the die in a desired pattern in the inner annular portion to ultimately form the non-conducting inserts.

The method of the present invention may thus include filling a die with two or three dissimilar powder metals. At the least, the die is partially filled in outer annular portions with a soft ferromagnetic powder metal and a non-ferromagnetic powder metal. For certain embodiments of the present invention, the die may also be filled with a soft ferromagnetic powder metal and a non-ferromagnetic powder metal in regions of the inner annular portion of the die. For other alternative embodiments of the present invention, the die may be filled with a hard ferromagnetic powder metal in regions of the outer annular portion of the die.

In one embodiment of the present invention using two or three dissimilar powder metals, the regions in the die are filled concurrently with the various powder metals, which are then concurrently pressed and sintered. In another embodiment of the present invention also using two or three dissimilar powder metals, the regions are filled sequentially with the powder metal being pressed and then sintered after each filling step. In other words, one powder metal is filled, pressed and sintered, and then the second powder metal is filled and the entire assembly is pressed and sintered, and then the optional third powder metal is filled and the entire assembly is pressed and sintered.

The pressing of the filled powder metal may be accomplished by uniaxially pressing the powder in a die, for example at a pressure of about 45–50 tsi. It should be understood that the pressure needed is dependent upon the particular powder metal materials that are chosen. In a further embodiment of the present invention, the pressing of the powder metal involves heating the die to a temperature in the range of about 275° F. (135° C.) to about 290° F. (143° C.), and heating the powders within the die to a temperature about 175° F. (79° C.) to about 225° F. (107° C.).

In an embodiment of the present invention, the sintering of the pressed powder comprises heating the compacted powder metal to a first temperature of about 1400° F. (760° C.) and holding at that temperature for about one hour. Generally, the powder metal includes a lubricating material, such as a plastic, on the particles to increase the strength of the material during compaction. The internal lubricant reduces particle-to-particle friction, thus allowing the compacted powder to achieve a higher green strength after sintering. The lubricant is then burned out of the composite during this initial sintering operation, also known as a delubrication or delubing step. A delubing for one hour is a general standard practice in the industry and it should be appreciated that times above or below one hour are sufficient for the purposes of the present invention if delubrication is achieved thereby. Likewise, the temperature may be varied from the general industry standard if the ultimate delubing function is performed thereby.

After delubing, the sintering temperature is raised to a full sintering temperature, which is generally in the industry about 2050° F. (1121° C.). During this full sintering, the compacted powder shrinks, and particle-to-particle bonds are formed, generally between iron particles. Standard industry practice involves full sintering for a period of one hour, but it should be understood that the sintering time and temperature may be adjusted as necessary. The sintering operation may be performed in a vacuum furnace, and the furnace may be filled with a controlled atmosphere, such as argon, nitrogen, hydrogen or combinations thereof. Alternatively, the sintering process may be performed in a continuous belt furnace, which is also generally provided with a controlled atmosphere, for example a hydrogen/nitrogen atmosphere such as 75% $H_2$/25% $N_2$. Other types of furnaces and furnace atmospheres may be used within the scope of the present invention as determined by one skilled in the art.

For the purpose of illustrating the method of the present invention, FIGS. 5–9C depict die inserts, hopper configurations and pressing techniques that may be used to achieve the concurrent filling or sequential filling of the powder metals and subsequent compaction to form the composite powder metal disks of the present invention. It is to be understood, however, that these illustrations are merely examples of possible methods for carrying out the present invention.

Figure 5:
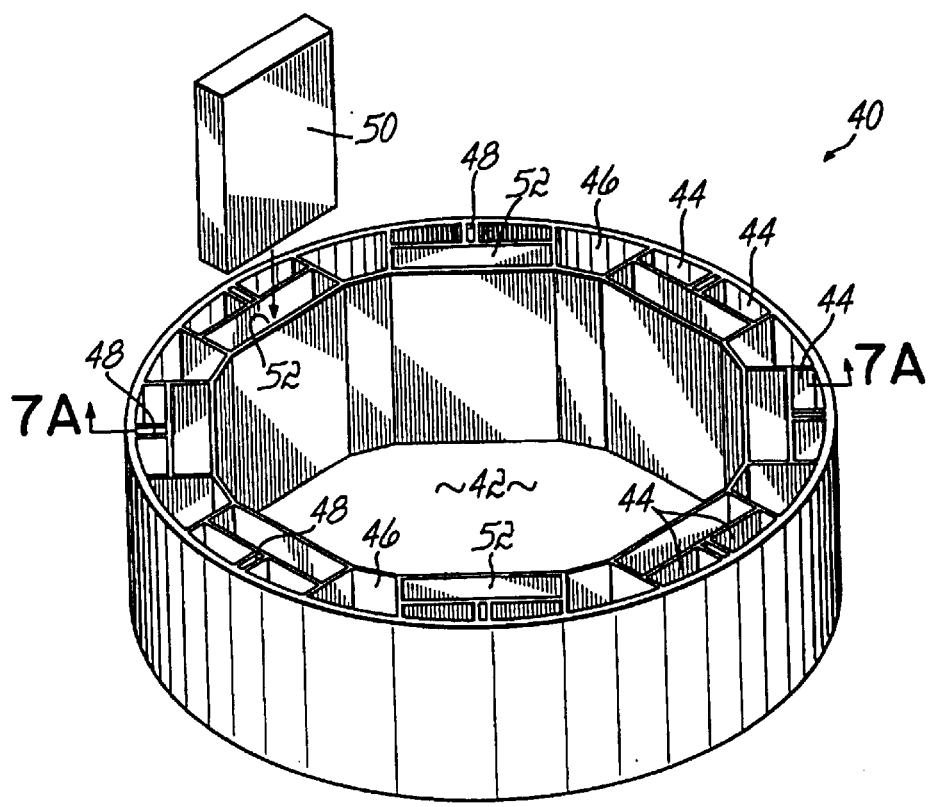
FIG. 5 is a perspective view of an insert for use in a method of the present invention.
Figure 6:
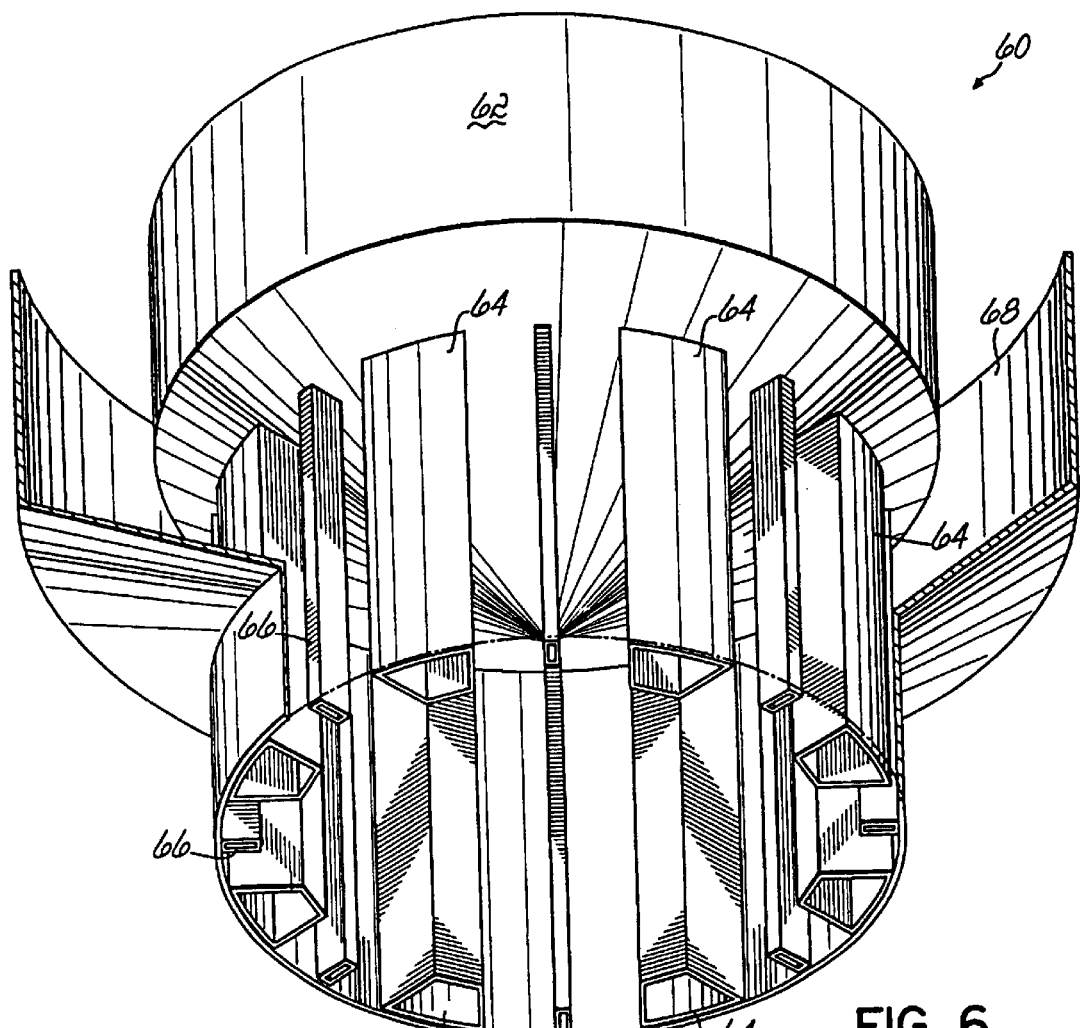
FIG. 6 is a perspective view of an inner bowl and outer bowl of a hopper that may be used for the filling aspect of the present invention.

FIG. 5 depicts a die insert 40 that may be placed within a die cavity to produce the powder metal disk 12 of FIGS. 1 and 2 in which the permanent magnets are prefabricated and affixed in the composite disk 12 after compaction and sintering of the powder metals. The two powder metals, i.e. the soft ferromagnetic and non-ferromagnetic powder metals, are filled concurrently or sequentially into the separate insert cavities 42, 44, 46, 48, and then the insert 40 is removed. Spacing or dummy inserts 50 may be used in cavities 52 to form spaces between the non-conducting barrier segments 22 into which the permanent magnets 20 may subsequently be inserted and affixed. By way of example only, FIG. 6 depicts a hopper assembly 60 that may be used to fill the insert 40 of FIG. 5 with the powder metals. In this assembly 60, an inner bowl 62 is provided having a plurality of tubes 64, 66 for forming the non-conducting barrier and bridge segments 22, 26, respectively, of the composite part or metal disk 12 of FIGS. 1 and 2. This inner bowl 62 is adapted to hold and deliver the non-ferromagnetic powder metal. An outer bowl 68 is positioned around the inner bowl 62, with the outer bowl 68 adapted to hold and deliver soft ferromagnetic powder metal. This dual hopper assembly 60 enables either concurrent or sequential filling of the die insert 40 of FIG. 5.

Figure 7A:
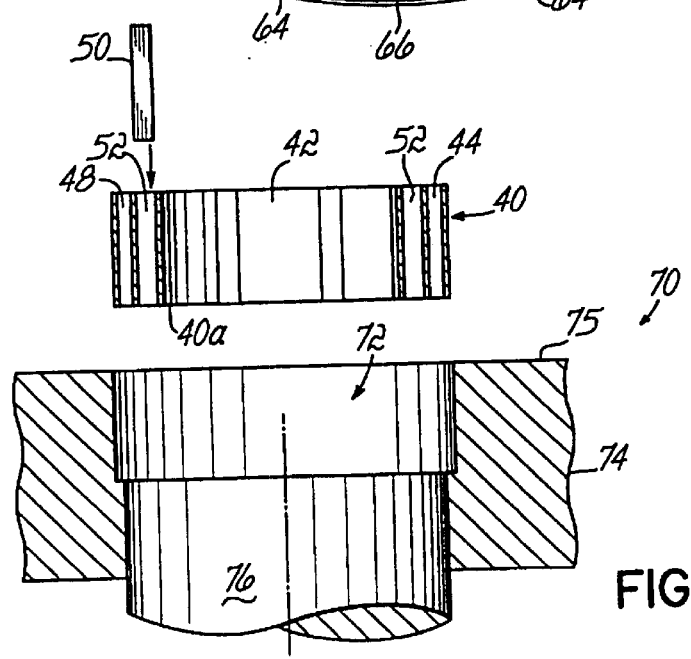
FIGS. 7A–7E are cross-sectional schematic views of a method of the present invention using the insert of FIG. 5 and the hopper of FIG. 6 to produce the rotor assembly of FIGS. 1 and 2.
Figure 7B:
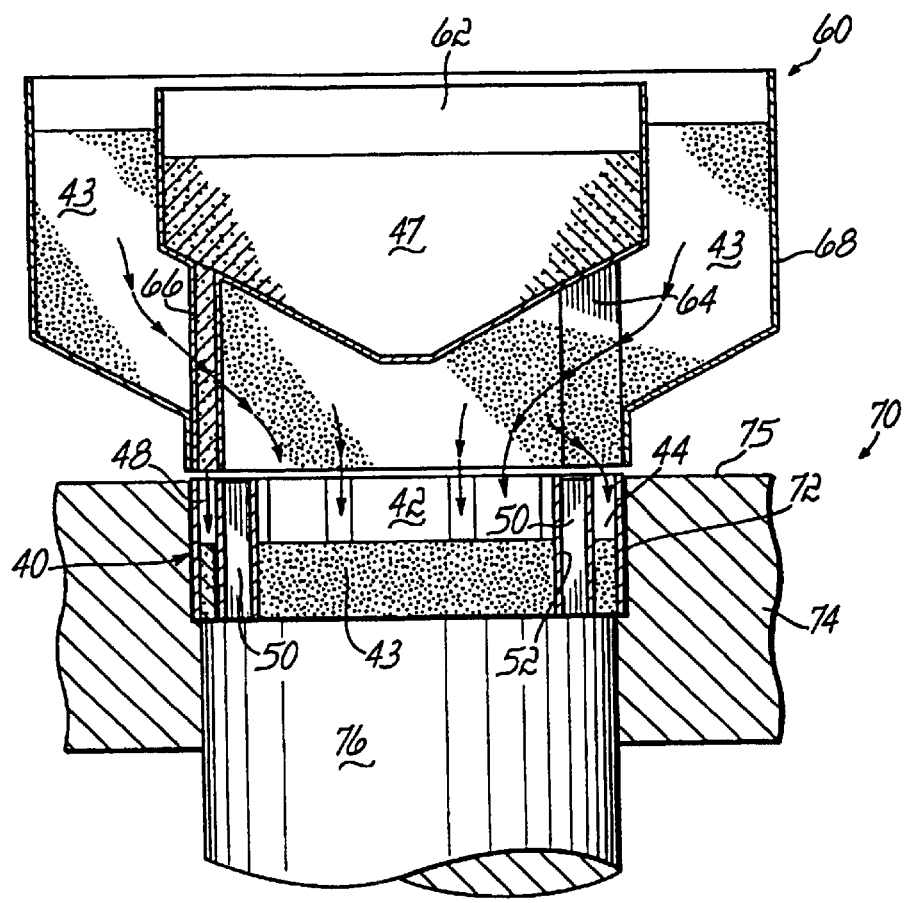
Figure 7C:
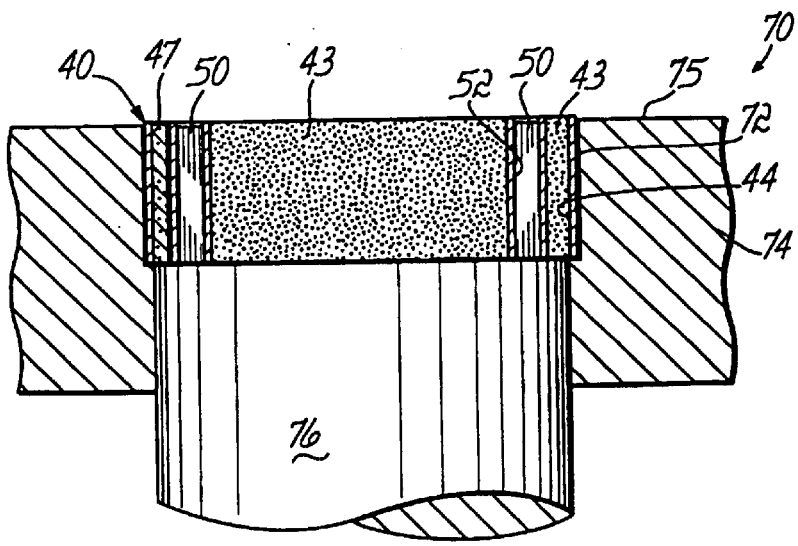
Figure 7D:
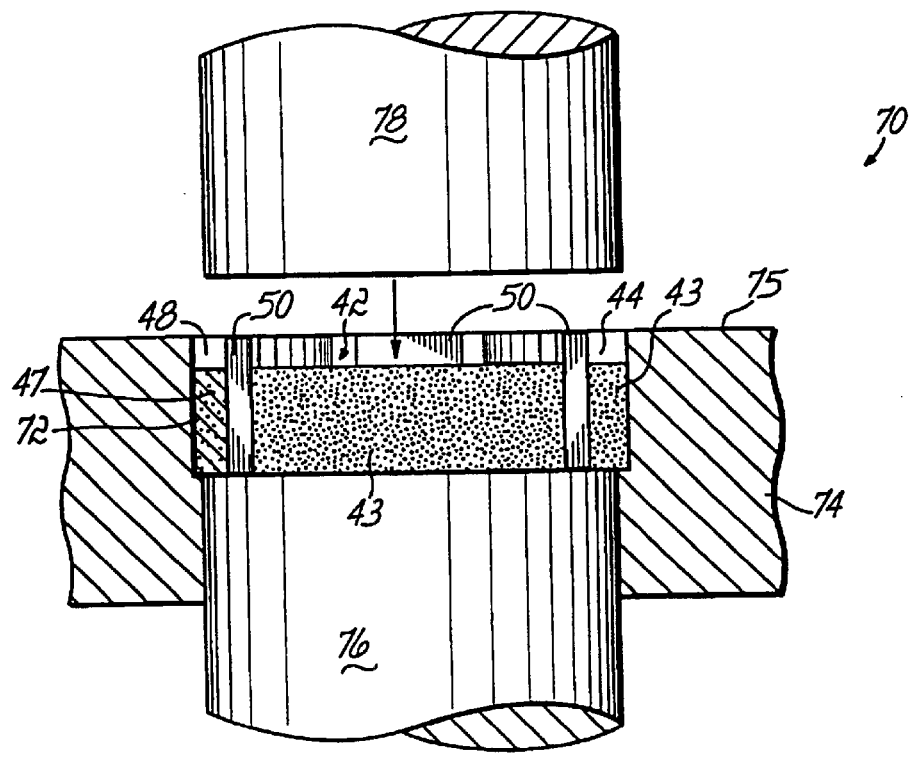
Figure 7E:
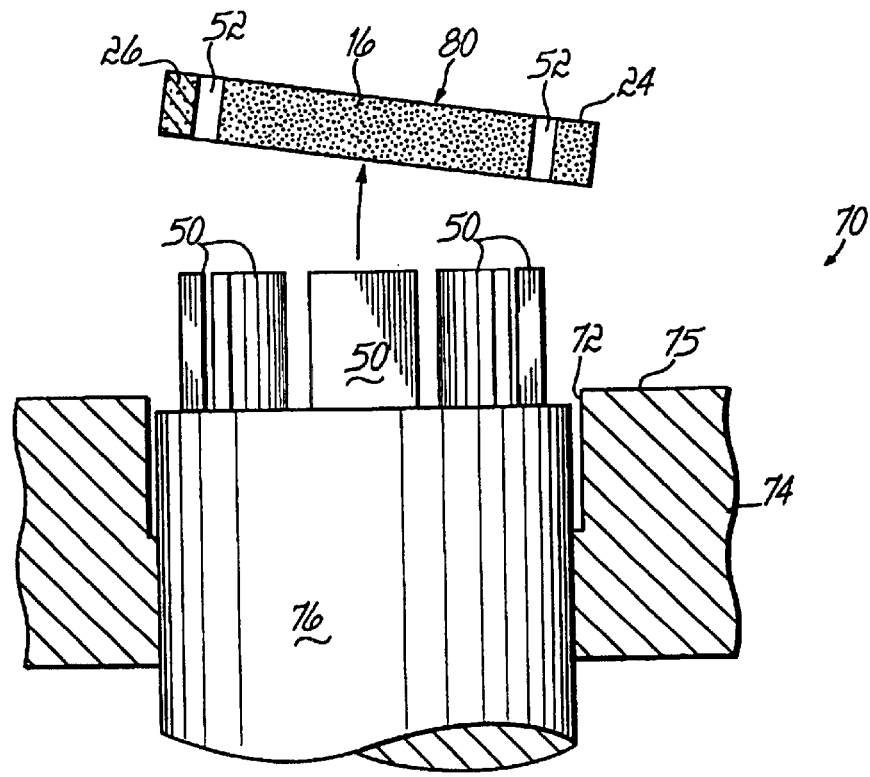

FIGS. 7A–7E depict schematic views in partial cross-section taken along line 7A—7A of FIG. 5 of how the die insert 40 of FIG. 5 and the hopper assembly 60 of FIG. 6 can be used with an uniaxial die press 70 to produce the composite powder metal disk 12 of FIGS. 1 and 2. In this method, the insert 40 is placed within a cavity 72 in the die 74, as shown in FIG. 7A, with a lower punch 76 of the press 70 abutting the bottom 40a of the insert 40. The hopper assembly 60 is placed over the insert 40 and the powder metals 43, 47 are filled into the insert cavities 42, 44, 46, 48, concurrently or sequentially, as shown in FIG. 7B. The hopper assembly 60 is then removed, leaving a filled insert 40 in the die cavity 72, as shown in FIG. 7C. Then the insert 40 is lifted out of the die cavity 72, which causes some settling of the powder, as seen in FIG. 7D. The upper punch 78 of the press 70 is then lowered down upon the powder-filled die cavity 72, as shown by the arrow in FIG. 7D, to uniaxially press the powders in the die cavity 72. The final composite part 80 is then ejected from the die cavity 72 by raising the lower punch 76 and the part 80 is transferred to a sintering furnace (not shown). Where the filling is sequential, the first powder is poured into either the inner bowl 62 or outer bowl 68, and a specially configured upper punch 78 is lowered so as to press the filled powder, and the partially filled and compacted insert (not shown) is sintered. The second fill is then effected and the insert 40 removed for pressing, ejection and sintering of the complete part 80.

Figure 8:
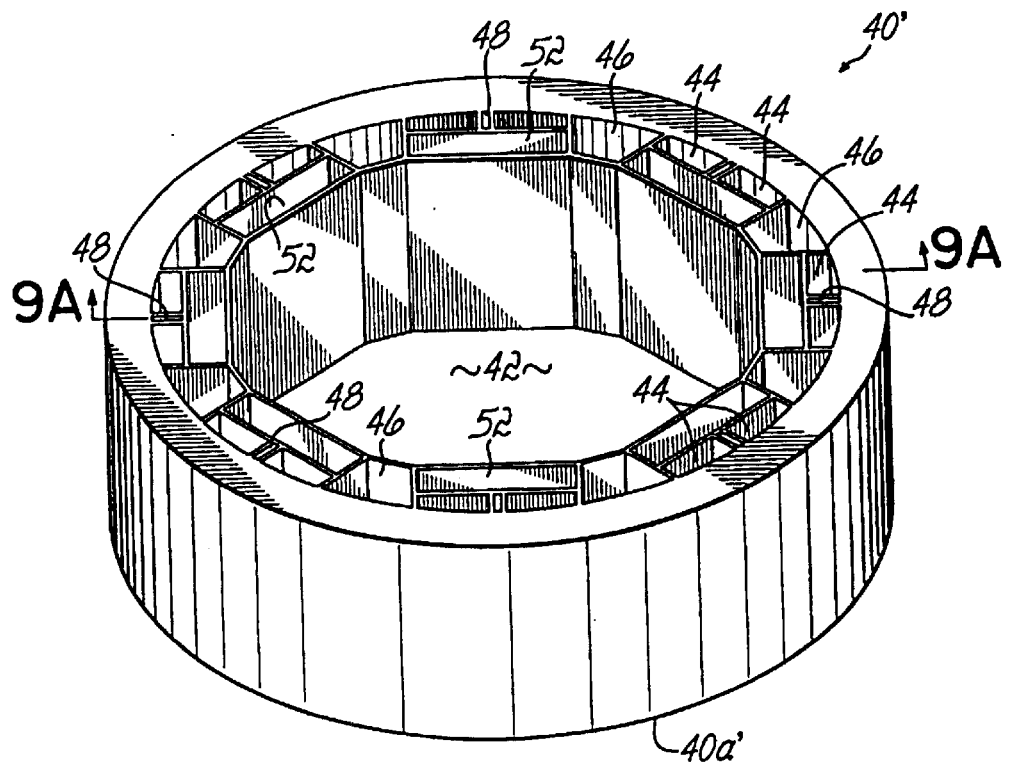
FIG. 8 is a perspective view of an insert for use in an alternative method of the present invention.
Figure 9A:
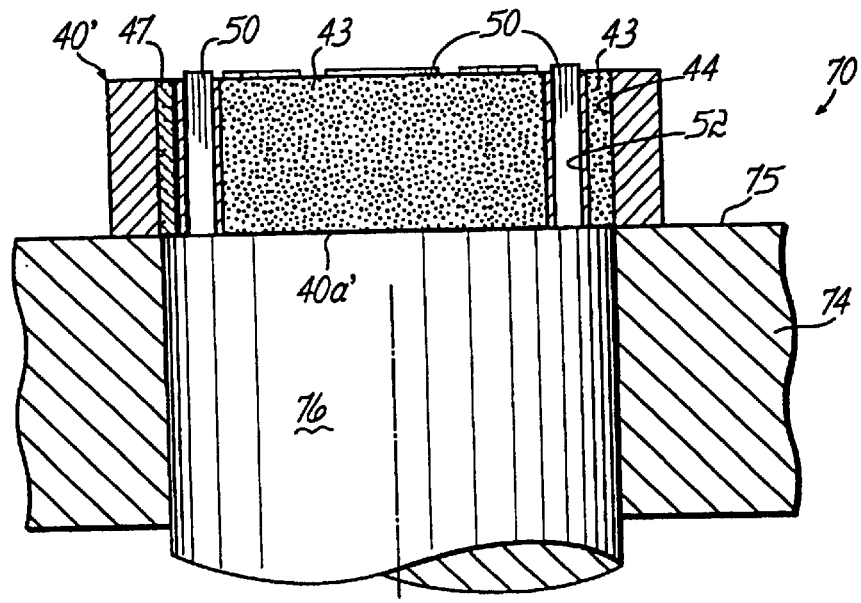
FIGS. 9A–9C are cross-sectional schematic views of the present invention using the insert of FIG. 8 and the hopper of FIG. 6 to produce the rotor assembly of FIGS. 1 and 2.
Figure 9B:
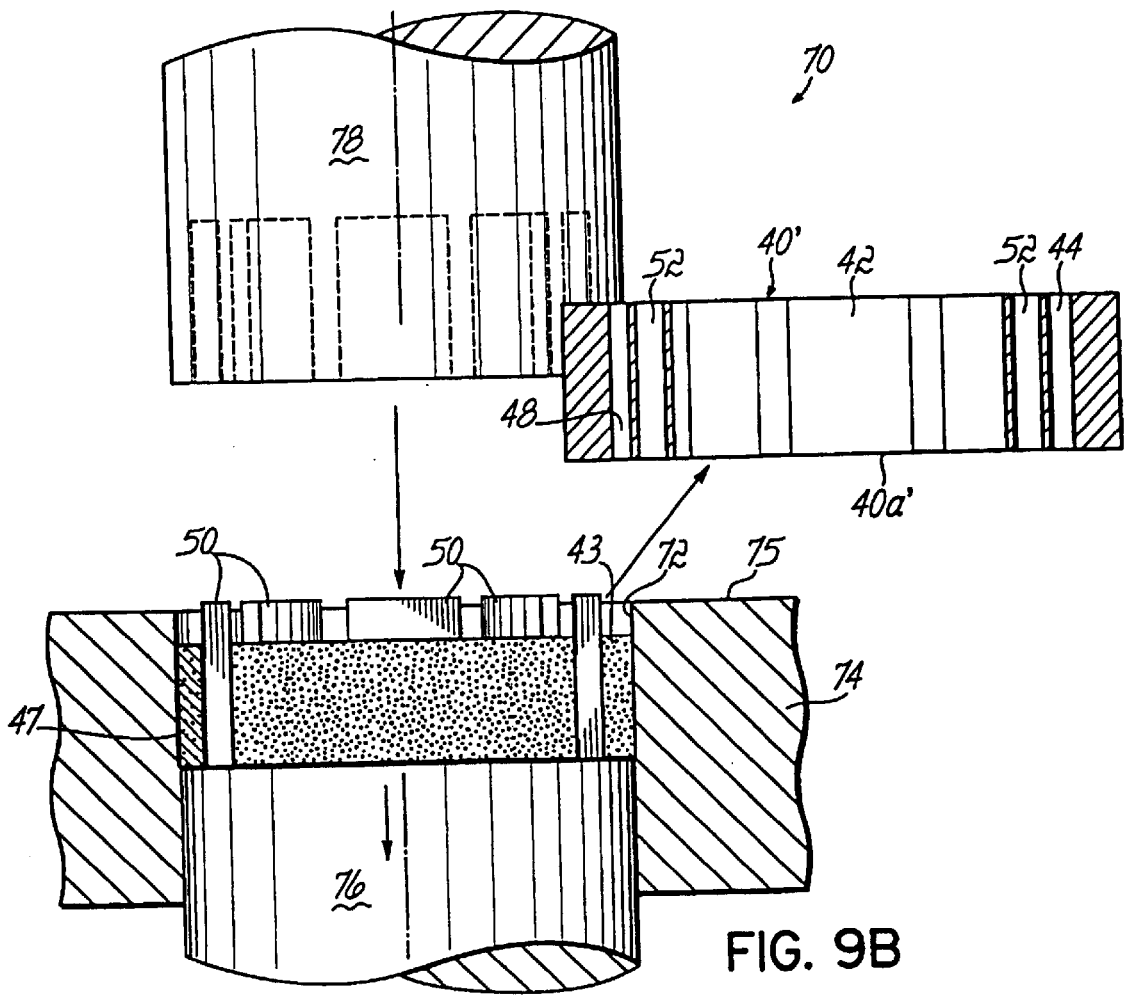
Figure 9C:
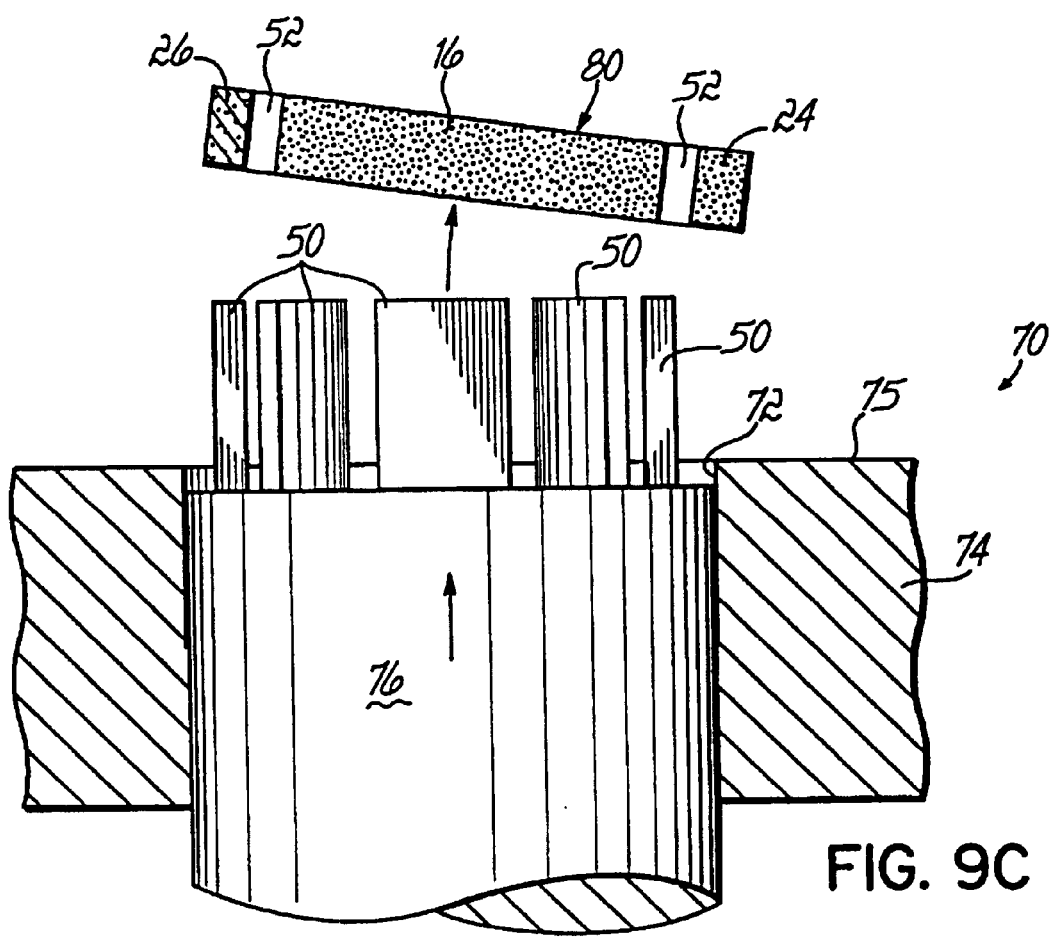

FIG. 8 depicts an alternative die insert 40' that may be placed on a top surface 75 of the die 74 over the die cavity 72 to again form the powder metal disk 12 depicted in FIGS. 1 and 2. FIGS. 9A–9C show in partial cross-section taken along line 9A—9A of FIG. 8 the method for using the insert 40' of FIG. 8. The insert is set on top surface 75 of the die 74 over the cavity 72 with the lower punch 76 in the ejection position, as shown in FIG. 9A. The powder metals 43, 47 are then filled into the insert 40', either concurrently or sequentially, as shown in FIG. 7B, and the lower punch 76 is then lowered to the fill position. The lowering of the punch 76 forms a vacuum which pulls the powder metals 43, 47 out of the bottom 40a' of the insert 40' and into the die cavity 72, as shown in FIG. 9B. The insert 40' is then removed from the top surface 75 of the die 74, and the upper punch 78 is lowered into the die cavity 72 to compact the powder metals 43, 47. The lower punch 76 is then raised to eject the final composite part 80, as shown in FIG. 9C, and the part 80 is then transferred to a sintering furnace (not shown). Where the filling is sequential, dummy placement segments (not shown) may be used if needed for the first filling/pressing/sintering sequence which can then be removed to effect the filling of the second powder metal.

In one embodiment of the present invention, pneumatic air hammers or tappers (not shown) may be placed on, in, or around the inserts 40, 40' used in either the method depicted in FIGS. 7A–7E or the method depicted in FIGS. 9A–9C. The vibrating of the insert 40, 40' enables the powder metal 43, 47 to flow out of the insert 40, 40' with greater ease as the insert 40, 40' is removed, and further enables a greater tap density. In another embodiment of the present invention, a dry lube is sprayed or added to the inside of the insert cavities 42, 44, 46, 48 used in either of those methods. Again, this dry lube helps to improve the flow of the powder metals 43, 47 out of the insert 40, 40'. In yet another embodiment of the present invention, heaters and thermocouples (not shown) may be used in conjunction with the insert 40, 40'. The heat keeps the powder warm, if warm compaction is being optimized, and again allows the powder metals 43, 47 to more easily flow out of the insert 40, 40'.

It should be further understood that while the methods shown and described herein are discussed with respect to forming a solid composite disk in which an aperture may be machined in the center after compaction or sintering for receiving the shaft of a rotor assembly, the composite part may be formed as a disk with the aperture already formed in the center. Likewise, the outer annular segment 18 may be first formed as a solid ring of pressed and sintered non-ferromagnetic and soft ferromagnetic powder metals, then subsequently machined to form spaces into which permanent magnets may be inserted.

For an embodiment of the present invention in which the permanent magnets are pressed and sintered hard ferromagnetic powder metal, a three-hopper assembly may be used to achieve a tri-fill process. Insert cavities 52 would be filled with the hard ferromagnetic powder metal. As with the dual-fill process described above, the tri-fill process can include concurrent filling of the powder metals or sequential filling of the powder metals.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, variations in the hopper assembly, filling method and die inserts may be employed to achieve a composite powder metal disk of the present invention, and variations in the magnetic configuration of the disks other than that shown in the Figures herein are well within the scope of the present invention. The invention in its broader aspects is therefore not limited to the specific details, representative apparatuses and methods and illustrative examples shown and described. Accordingly, departures may be made from such details without departing from the scope or spirit of applicant's general inventive concept.

What is claimed is:

1. A method of making a powder metal rotor for a circumferential type interior permanent magnet machine, the method comprising:

filling a plurality of discrete first regions within an outer annular region of a disk-shaped die with a non-ferromagnetic powder metal in solid particulate form so as to leave spaces between each discrete first region;

filling a plurality of discrete second regions in the outer annular region between the first regions with a soft ferromagnetic powder metal in solid particulate form so as to maintain a radially inner circumferentially extending space between each discrete first region;

pressing the solid particulate form powders in the die to form a compacted powder metal disk;

sintering the compacted powder metal disk; and providing permanent magnets in the radially inner circumferentially extending spaces between the discrete first regions of the outer annular region in an arrangement of alternating polarity to form a composite powder metal disk having a plurality of alternating polarity permanent magnets separated by magnetically non-conducting barrier segments and radially embedded by magnetically conducting segments.

2. The method of claim 1 further comprising filling an inner annular region of the die with a soft ferromagnetic powder metal in solid particulate form to form the disk further having an inner annular magnetically conducting segment.

3. The method of claim 1, wherein all the regions are filled concurrently.

4. The method of claim 1, wherein all the regions are filled sequentially with the powder metal being pressed and sintered after each filling step.

5. The method of claim 1, wherein the providing of permanent magnets includes affixing prefabricated permanent magnets to the barrier segments.

6. The method of claim 1, wherein the providing of permanent magnets includes filling the radially inner circumferentially extending spaces with a hard ferromagnetic powder metal in solid particulate form, pressing the hard ferromagnetic powder metal and sintering the pressed powder.

7. The method of claim 1, wherein the soft ferromagnetic powder metal is Ni, Fe, Co or an alloy thereof.

8. The method of claim 1, wherein the soft ferromagnetic powder metal is a high purity iron powder with a minor addition of phosphorus.

9. The method of claim 1, wherein the non-ferromagnetic powder metal is an austenitic stainless steel.

10. The method of claim 1, wherein the non-ferromagnetic powder metal is an AISI 8000 series steel.

11. The method of claim 1, wherein the pressing comprises uniaxially pressing the powders in the die.

12. The method of claim 1, wherein the pressing comprises pre-heating the powders and pre-heating the die.

13. The method of claim 1, wherein, after the pressing, the compacted powder metal disk is delubricated at a first temperature, followed by sintering at a second temperature greater than the first temperature.

14. The method of claim 1 further comprising filling the discrete second regions so as to further maintain a radially extending unfilled region through each discrete second region and filling the radially extending unfilled regions with a non-ferromagnetic powder metal, in solid particulate form pressing the non-ferromagnetic powder metal, and sintering the pressed powder to form intermediate magnetically non-conducting bridge segments in the magnetically conducting segments.

15. A method of making a powder metal rotor for a circumferential type interior permanent magnet machine, the method comprising:

filling an inner annular region of a disk-shaped die with a soft ferromagnetic powder metal in solid particulate form;

filling a plurality of discrete first regions within an outer annular region of the die with a non-ferromagnetic powder metal in solid particulate form so as to leave spaces between each discrete first region;

filling a plurality of discrete second regions in the outer annular region between the first regions with a soft ferromagnetic powder metal in solid particulate form so as to maintain a radially inner circumferentially extending space between each discrete first region;

pressing the solid particulate form powders in the die to form a compacted powder metal disk;

sintering the compacted powder metal disk; and providing permanent magnets in the radially inner circumferentially extending spaces between the discrete first regions of the outer annular region in an arrangement of alternating polarity to form a composite powder metal disk having an inner annular magnetically conducting segment and an outer annular permanent magnet segment of a plurality of alternating polarity permanent magnets separated by magnetically non-conducting barrier segments and radially embedded by magnetically conducting segments.

16. The method of claim 15, wherein all the regions are filled concurrently.

17. The method of claim 15, wherein all the regions are filled sequentially with the powder metal being pressed and sintered after each filling step.

18. The method of claim 15, wherein the providing of permanent magnets includes affixing prefabricated permanent magnets to the inner segment.

19. The method of claim 15, wherein the providing of permanent magnets includes filling the radially inner circumferentially extending spaces with a hard ferromagnetic powder metal in solid particulate form, pressing the hard ferromagnetic powder metal and sintering the pressed powder.

20. The method of claim 15, wherein the soft ferromagnetic powder metal is Ni, Fe, Co or an alloy thereof.

21. The method of claim 15, wherein the soft ferromagnetic powder metal is a high purity iron powder with a minor addition of phosphorus.

22. The method of claim 15, wherein the non-ferromagnetic powder metal is an austenitic stainless steel.

23. The method of claim 15, wherein the non-ferromagnetic powder metal is an AISI 8000 series steel.

24. The method of claim 15, wherein the pressing comprises uniaxially pressing the powders in the die.

25. The method of claim 15, wherein the pressing comprises pre-heating the powders and pre-heating the die.

26. The method of claim 15, wherein, after the pressing, the compacted powder metal disk is delubricated at a first temperature, followed by sintering at a second temperature greater than the first temperature.

27. The method of claim 15, wherein the sintering is performed in a vacuum furnace having a controlled atmosphere.

28. The method of claim 15, wherein the sintering is performed in a belt furnace having a controlled atmosphere.

29. The method of claim 15 further comprising filling the discrete second regions so as to further maintain a radially extending unfilled region through each discrete second region and filling the radially extending unfilled regions with a non-ferromagnetic powder metal in solid particulate form, pressing the non-ferromagnetic powder metal, and sintering the pressed powder to form intermediate magnetically non-conducting bridge segments in the magnetically conducting segments of the outer annular permanent magnet segment.

30. The method of claim 15 further comprising filling a portion of the inner annular region in a desired pattern with a non-ferromagnetic powder metal in solid particulate form, pressing the non-ferromagnetic powder metal, and sintering the pressed powder to form an inner magnetically non-conducting insert.

31. The method of claim 15 further comprising stacking a plurality of the composite powder metal disks axially along a shaft to form a powder metal rotor assembly.

32. A method of making a powder metal rotor for a circumferential type interior permanent magnet machine, the method comprising:

filling an inner annular region and a plurality of first portions of an outer annular region of a disk-shaped die with a soft ferromagnetic powder metal in solid particulate form, pressing and sintering the soft ferromagnetic powder metal in the die to form a compacted and sintered inner annular magnetically conducting segment and a plurality of compacted and sintered outer magnetically conducting segments;

filling a plurality of second portions in the outer annular region of the die with a non-ferromagnetic powder metal in solid particulate form, the second portions being in alternating relation with the outer magnetically conducting segments;

pressing the non-ferromagnetic powder metal in the die to form a plurality of compacted magnetically non-conducting barrier segments;

sintering the compacted magnetically non-conducting barrier segments and the compacted and sintered inner annular and outer magnetically conducting segments; and providing circumferentially extending permanent magnets in a plurality of radially inner fourth portions in the outer annular region between the magnetically non-conducting barrier segments in an arrangement of alternating polarity to form a composite powder metal disk having an inner annular magnetically conducting segment and an outer annular permanent magnet segment of a plurality of alternating polarity permanent magnets separated by magnetically non-conducting barrier segments and radially embedded by magnetically conducting segments.

33. The method of claim 32, wherein the providing step includes, after the second sintering step, filling the fourth portions with a hard ferromagnetic powder metal, pressing the hard ferromagnetic powder metal in the die to form a plurality of compacted permanent magnet segments, and sintering the compacted permanent magnet segments and the compacted and sintered inner annular and outer conducting segments and magnetically non-conducting barrier segments.

34. The method of claim 32 further comprising affixing prefabricated permanent magnets of alternating polarity in the fourth portions between the magnetically non-conducting barrier segments.

35. The method of claim 32, wherein the soft ferromagnetic powder metal is Ni, Fe, Co or an alloy thereof.

36. The method of claim 32, wherein the soft ferromagnetic powder metal is a high purity iron powder with a minor addition of phosphorus.

37. The method of claim 32, wherein the non-ferromagnetic powder metal is an austenitic stainless steel.

38. The method of claim 32, wherein the non-ferromagnetic powder metal is an AISI 8000 series steel.

39. The method of claim 32, wherein each pressing comprises uniaxially pressing the powder in the die.

40. The method of claim 32, wherein each pressing comprises pre-heating the powder and pre-heating the die.

41. The method of claim 32, wherein, after each pressing, the compacted segments are delubricated at a first temperature, followed by sintering at a second temperature greater than the first temperature.

42. The method of claim 32, wherein each sintering is performed in a vacuum furnace having a controlled atmosphere.

43. The method of claim 32, wherein each sintering is performed in a belt furnace having a controlled atmosphere.

44. The method of claim 32 further comprising stacking a plurality of the composite powder metal disks axially along a shaft to form a powder metal rotor assembly.

45. A method of making a powder metal rotor for a circumferential type interior permanent magnet machine, the method comprising:

filling an inner annular region and a plurality of first portions of an outer annular region of a disk-shaped die with a soft ferromagnetic powder metal;

pressing and sintering the soft ferromagnetic powder metal in the die to form a compacted and sintered inner annular magnetically conducting segment and a plurality of compacted and sintered outer magnetically conducting segments;

filling a plurality of second portions in the outer annular region of the die with a non-ferromagnetic powder metal, the second portions being in alternating relation with the outer magnetically conducting segments;

filling a plurality of third portions in the outer annular region of the die with a non-ferromagnetic powder metal, the third portions radially extending through an intermediate portion of each first portion;

pressing the non-ferromagnetic powder metal in the die to form a plurality of compacted magnetically non-conducting barrier segments and bridge segments;

sintering the compacted magnetically non-conducting barrier and bridge segments and the compacted and sintered inner annular and outer magnetically conducting segments; and providing circumferentially extending permanent magnets in a plurality of radially inner fourth portions in the outer annular region between the magnetically non-conducting barrier segments in an arrangement of alternating polarity to form a composite powder metal disk having an inner annular magnetically conducting segment and an outer annular permanent magnet segment of a plurality of alternating polarity permanent magnets separated by magnetically non-conducting barrier segments and radially embedded by magnetically conducting segments with intermediate magnetically non-conducting bridge segments.

46. The method of claim 45, wherein the providing step includes, after the second sintering step, filling the fourth portions with a hard ferromagnetic powder metal, pressing the hard ferromagnetic powder metal in the die to form a plurality of compacted permanent magnet segments, and sintering the compacted permanent magnet segments and the compacted and sintered inner annular and outer conducting segments and magnetically non-conducting barrier and bridge segments.

47. The method of claim 45 further comprising affixing prefabricated permanent magnets of alternating polarity in the fourth portions between the magnetically non-conducting barrier segments.

48. The method of claim 45, wherein the soft ferromagnetic powder metal is Ni, Fe, Co or an alloy thereof.

49. The method of claim 45, wherein the soft ferromagnetic powder metal is a high purity iron powder with a minor addition of phosphorus.

50. The method of claim 45, wherein the non-ferromagnetic powder metal is an austenitic stainless steel.

51. The method of claim 45, wherein the non-ferromagnetic powder metal is an AISI 8000 series steel.

52. The method of claim 45, wherein each pressing comprises uniaxially pressing the powder in the die.

53. The method of claim 45, wherein each pressing comprises pre-heating the powder and pre-heating the die.

54. The method of claim 45, wherein, after each pressing, the compacted segments are delubricated at a first temperature, followed by sintering at a second temperature greater than the first temperature.

55. The method of claim 45, wherein each sintering is performed in a vacuum furnace having a controlled atmosphere.

56. The method of claim 45, wherein each sintering is performed in a belt furnace having a controlled atmosphere.

57. The method of claim 45 further comprising stacking a plurality of the composite powder metal disks axially along a shaft to form a powder metal rotor assembly.

58. A method of making a powder metal rotor for a circumferential type interior permanent magnet machine, the method comprising:
 filling a plurality of discrete first regions within an outer annular region of a disk-shaped die with a non-ferromagnetic powder metal so as to leave spaces between each discrete first region;
 filling a plurality of discrete second regions in the outer annular region between the first regions with a soft ferromagnetic powder metal so as to maintain a radially inner circumferentially extending space between each discrete first region while maintaining a radially extending unfilled region through each discrete second region and filling the radially extending unfilled regions with a non-ferromagnetic powder metal;
 pressing the powders in the die to form a compacted powder metal disk;
 sintering the compacted powder metal disk; and
 providing permanent magnets in the radially inner circumferentially extending spaces between the discrete first regions of the outer annular region in an arrangement of alternating polarity to form a composite powder metal disk having a plurality of alternating polarity permanent magnets separated by magnetically non-conducting barrier segments and radially embedded by magnetically conducting segments with intermediate magnetically non-conducting bridge segments.

59. A method of making a powder metal rotor for a circumferential type interior permanent magnet machine, the method comprising:
 filling an inner annular region of a disk-shaped die with a soft ferromagnetic powder metal;
 filling a plurality of discrete first regions within an outer annular region of the die with a non-ferromagnetic powder metal so as to leave spaces between each discrete first region;
 filling a plurality of discrete second regions in the outer annular region between the first regions with a soft ferromagnetic powder metal so as to maintain a radially inner circumferentially extending space between each discrete first region while maintaining a radially extending unfilled region through each discrete second region and filling the radially extending unfilled regions with a non-ferromagnetic powder metal;
 pressing the powders in the die to form a compacted powder metal disk;
 sintering the compacted powder metal disk; and
 providing permanent magnets in the radially inner circumferentially extending spaces between the discrete first regions of the outer annular region in an arrangement of alternating polarity to form a composite powder metal disk having an inner annular magnetically conducting segment and an outer annular permanent magnet segment of a plurality of alternating polarity permanent magnets separated by magnetically non-conducting barrier segments and radially embedded by magnetically conducting segments with intermediate magnetically non-conducting bridge segments.

60. A method of making a powder metal rotor for a circumferential type interior permanent magnet machine, the method comprising:
 filling an inner annular region of a disk-shaped die with a soft ferromagnetic powder metal;
 filling a portion of the inner annular region in a desired pattern with a non-ferromagnetic powder metal;
 filling a plurality of discrete first regions within an outer annular region of the die with a non-ferromagnetic powder metal so as to leave spaces between each discrete first region;
 filling a plurality of discrete second regions in the outer annular region between the first regions with a soft ferromagnetic powder metal so as to maintain a radially inner circumferentially extending space between each discrete first region;
 pressing the powders in the die to form a compacted powder metal disk;
 sintering the compacted powder metal disk; and
 providing permanent magnets in the radially inner circumferentially extending spaces between the discrete first regions of the outer annular region in an arrangement of alternating polarity to form a composite powder metal disk having an inner annular magnetically conducting segment with an inner magnetically non-conducting insert and an outer annular permanent magnet segment of a plurality of alternating polarity permanent magnets separated by magnetically non-conducting barrier segments and radially embedded by magnetically conducting segments.

\* \* \* \* \*